(12) United States Patent
Steffensen

(10) Patent No.: US 8,960,747 B2
(45) Date of Patent: Feb. 24, 2015

(54) LIFTING BRACKET

(71) Applicant: Soeren Steffensen, Tjaereborg (DK)

(72) Inventor: Soeren Steffensen, Tjaereborg (DK)

(73) Assignee: Siemens Aktiengesellschaft, München (DE)

(*) Notice: Subject to any disclaimer, the term of this patent is extended or adjusted under 35 U.S.C. 154(b) by 12 days.

(21) Appl. No.: 13/706,381

(22) Filed: Dec. 6, 2012

(65) Prior Publication Data
US 2013/0147218 A1 Jun. 13, 2013

(30) Foreign Application Priority Data
Dec. 12, 2011 (EP) .................................... 11193069

(51) Int. Cl.
*B66C 1/00* (2006.01)
*B66F 11/00* (2006.01)
*F03D 1/00* (2006.01)
*B66C 1/10* (2006.01)

(52) U.S. Cl.
CPC ................ *B66F 11/00* (2013.01); *F03D 1/001* (2013.01); *B66C 1/108* (2013.01); *F05B 2230/61* (2013.01); *Y02E 10/728* (2013.01)
USPC ....................................................... 294/67.5

(58) Field of Classification Search
USPC ............ 294/67.1, 67.21, 67.22, 67.33, 67.41, 294/67.5, 81.3, 81.5, 81.54; 269/143, 249
See application file for complete search history.

(56) References Cited

U.S. PATENT DOCUMENTS

| 2,370,528 | A | * | 2/1945 | Fontaine | 294/197 |
| 3,028,186 | A | * | 4/1962 | Skubic | 294/68.3 |
| 4,973,094 | A | * | 11/1990 | Tana et al. | 294/81.21 |
| 5,240,298 | A | * | 8/1993 | Teaby et al. | 294/81.4 |
| 5,660,422 | A | * | 8/1997 | Knisley | 294/67.33 |
| 5,800,000 | A | * | 9/1998 | Shockley | 294/81.3 |
| 2007/0164577 | A1 | * | 7/2007 | Mariani | 294/67.5 |

FOREIGN PATENT DOCUMENTS

| EP | 2072812 A2 | 6/2009 |
| EP | 2345811 A1 | 7/2011 |
| WO | WO 2010055142 A2 | 5/2010 |

* cited by examiner

*Primary Examiner* — Stephen Vu

(57) ABSTRACT

A lifting bracket is disclosed. The lifting bracket includes a point of suspension realized to attach a load to be lifted to a lifting means; a lifting angle adjusting means realized to adjust the position of the point of suspension on the lifting bracket according to a specific lifting angle; and a coupling device for rigidly coupling the lifting bracket to the load to be lifted. Also described are a lifting assembly and a method of lifting a wind turbine generator transport assembly, including a wind turbine generator mounted on a wind turbine generator transport frame, at a specific lifting angle.

15 Claims, 6 Drawing Sheets

LIFTING BRACKET

CROSS REFERENCE TO RELATED APPLICATIONS

This application claims priority of European Patent Office application No. 11193069.9 EP filed Dec. 12, 2011. All of the applications are incorporated by reference herein in their entirety.

FIELD OF INVENTION

A lifting bracket, a lifting assembly, and a method of lifting a wind turbine generator transport assembly are disclosed.

BACKGROUND OF INVENTION

With developments in wind turbine technology, wind turbine generators are becoming larger, and therefore also heavier. Usually, a wind turbine is put together on site, i.e. a nacelle is mounted on top of a pre-assembled tower, and the blades are connected to a hub at the front of the nacelle. Generally, the generator is already mounted in the nacelle before this is lifted into place on top of the tower. In a direct-drive wind turbine design, the generator is essentially mounted onto the front of the nacelle. However, due to transportation issues such as the length and weight of the nacelle connected to the generator, it may not be feasible to mount the generator to the nacelle for combined lifting into place. In such situations, therefore, the nacelle is first mounted on top of the tower, and the generator is then hoisted into place, for example by crane, and technicians then connect the generator to the nacelle. However, a generator can be very heavy—in the region of 120000 kg—and this can make the generator unwieldy and hazardous to maneuver as it is suspended in front of the nacelle. Poor weather conditions may make this task even more difficult to perform. Obviously, great care must be taken to avoid any damage to the generator. Furthermore, the use of prior art apparatus for lifting a wind turbine generator to its point of assembly may require technicians in the nacelle to also adjust the fitting angle of the generator, for example to suit an angle of attack of the wind turbine. Again, such a manual adjustment may be hazardous as well as time-consuming to perform.

SUMMARY OF INVENTION

An improved way of lifting a wind turbine generator to a point of assembly is provided by the lifting bracket, by the lifting assembly, and by the method of lifting a wind turbine generator transport assembly according to the independent claims.

The lifting bracket comprises a point of suspension realized to attach a load to be lifted to a lifting means; a lifting angle adjusting means realized to adjust the position of the point of suspension on the lifting bracket relative to the load according to a specific non-zero lifting angle; and a coupling device for rigidly coupling the lifting bracket to the load to be lifted.

Here, the term "lifting means" can be understood to mean a crane, helicopter, or any apparatus suitable for lifting a load. The term "lifting angle" can be understood as the angle subtended between a main axis of the load and a vertical plumb line. The coupling device rigidly couples the lifting bracket to the load to be lifted, so that the load to be lifted and the lifting bracket essentially act as a single entity, which allows the lifting angle of the load to be maintained during the lifting procedure. The term "non-zero lifting angle" is to be understood as a lifting angle that is non-zero relative to a true vertical or horizontal, for example a non-zero angle relative to a vertical plumb line.

The lifting bracket provides that the entire load may be lifted at a specific lifting angle, for example at an angle corresponding to such an angle of attack. Therefore, the load can be lifted at a required mounting angle. For example, as indicated in the introduction, the angle of attack of a wind turbine may be tilted by a few degrees with respect to the horizontal in order to optimize the performance of the wind turbine. Therefore, if a wind turbine generator is being lifted by the lifting bracket, the generator can be lifted so that it is suspended at an angle corresponding to the angle of attack of the wind turbine.

The lifting assembly comprises a lifting bracket, and a wind turbine generator transport assembly comprising a wind turbine generator mounted on a wind turbine generator transport frame; wherein the lifting bracket is rigidly coupled to the wind turbine generator transport frame by means of the coupling device such that the lifting bracket extension and the wind turbine generator transport assembly share a common longitudinal axis.

The lifting assembly provides that the lifting bracket and the load to be lifted—in this case the wind turbine generator transport assembly—act as a single entity. Any adjustment of the lifting angle adjusting means results in a corresponding alteration of the lifting angle. Using the lifting assembly, it is therefore possible to precisely control the lifting angle of the load to be lifted.

The method of lifting a wind turbine generator transport assembly—comprising a wind turbine generator mounted on a wind turbine generator transport frame—at a specific lifting angle comprises the steps of connecting a lifting bracket to the wind turbine generator transport assembly to give a lifting assembly; determining a position of the point of suspension along the lifting bracket to obtain the specific lifting angle for that wind turbine generator; adjusting the lifting angle adjusting means according to the determined position of the point of suspension; connecting a suspending means between a lifting means and the point of suspension of the lifting bracket; and raising the lifting assembly to lift the wind turbine generator at the specific angle to an assembly point.

Here, the "assembly point", as indicated in the introduction, can be understood to mean a cavity or opening at the front of the nacelle (which may already be in place on the tower), into which or onto which the generator can be secured. The suspending means can be any suitable chain, cable or rope that can bear or carry the weight of the load suspended from the lifting means. The method provides that the generator may be hoisted or lifted at the required lifting angle so that no further corrections need be made to the generator angle once it is suspended in place in front of the nacelle.

Features are given by the dependent claims, as revealed in the following description. Features of different claim categories may be combined as appropriate to give further embodiments not described herein.

The lifting bracket can be connected or fastened to the load to the lifted in any appropriate manner, for example coupling device of the lifting bracket can be bolted or welded to a suitable surface element of the load. In an embodiment, the coupling device comprises a lifting bracket extension realized for coupling with the load to be lifted such that the lifting bracket extension and the load to be lifted share a common longitudinal axis. For example, the coupling device can comprise a frame insert portion for inserting into an opening of a transport frame of the load to be lifted. The opening in the transport frame can be arranged along a longitudinal axis of the transport frame, and can extend from an outer surface of the transport frame into the body of the transport frame. The frame insert portion of the lifting bracket can fit into this opening, and can be secured by bolts, locking pins, or any other suitable fastening means. The frame insert portion of the lifting bracket and the opening of a transport frame may be realized so that their shared axis corresponds to a vertical central axis of the lifting assembly when this is in an upright position.

The lifting angle adjusting means can be realized to be manually mountable and dismountable at different positions on the lifting bracket. For example, the lifting angle adjusting means could be manually mounted at a first position to obtain a first lifting angle, or at a second position to obtain a second lifting angle. However, in a further embodiment, the lifting angle adjusting means is movably mounted on the lifting bracket. For example, the lifting angle adjusting means can be realized as a trolley that can slide or roll along the lifting bracket. In this way, the lifting angle adjusting means does not need to be removed from the lifting bracket.

The way in which the lifting angle adjusting means is movably mounted on the lifting bracket can be directly related to the manner in which the lifting angle is adjusted. The lifting angle adjusting means may be mounted on the lifting bracket such that the lifting angle adjusting means is linearly displaceable along the lifting bracket. The direction of travel of the lifting angle adjusting means then governs the direction of adjustment of the lifting angle. For example, the lifting angle adjusting means can be movably mounted on the lifting bracket so that the lifting angle can be skewed in a vertical plane. However, the direction of linear displacement of the lifting angle adjusting means along the lifting bracket is essentially perpendicular to a common longitudinal axis of the coupling device and the load to be lifted. In this way, the lifting angle can be tilted in a specific vertical plane. This will become clear in the explanation of the diagrams.

The lifting angle adjusting means may comprise a wheel arrangement realized to allow a continuous linear displacement of the lifting angle adjusting means along the lifting bracket. In this way, the lifting angle adjusting means can travel smoothly along the lifting bracket.

The maximum extent of travel of the lifting angle adjusting means can define the maximum adjustment that can be made to the lifting angle. Therefore, in an embodiment, the lifting angle adjusting means is realized to obtain a lifting angle corresponding to the fitting angle of a generator of a wind turbine, particularly of a direct-drive wind turbine. The nacelle—and therefore also the generator, which is directly mounted onto the nacelle—is tilted up from the horizontal at an "angle of attack", which serves to increase the efficiency of the wind turbine. Generally, it may be assumed that a central axis of the nacelle, tilted upward by this angle of attack, is at right angles to a central axis of rotation of the generator. Therefore, after undergoing a rotation of 90°, the angle of attack of the nacelle is essentially the same as the fitting angle of the generator, which is measured relative to a vertical plumb line. The lifting angle adjusting means can be adjusted to obtain this fitting angle for the load to be lifted. For example, for a nacelle that is tilted upward from the horizontal by 6°, the lifting bracket and the lifting angle adjusting means can be realized to obtain a lifting angle of 6°—and therefore also a fitting angle of 6°—when lifting a generator transport assembly to an assembly point in front of the nacelle.

The point of suspension can be arranged on the lifting bracket separate from the lifting angle adjusting means. In this case, the distance between the lifting bracket and the lifting angle adjusting means must be taken into account when calculating the position of the lifting angle adjusting means on the lifting bracket for a specific desired lifting angle. The point of suspension may be arranged on the lifting angle adjusting means. For example, the point of suspension can comprise one or more trunnions, for example a trunnion on either side of the lifting angle adjusting means, around which a cable, rope or sling can be attached for suspending the lifting assembly from a crane or other lifting apparatus.

The position of the lifting angle adjusting means on the lifting bracket could be adjusted manually, for example by pushing or pulling the lifting angle adjusting means along the lifting bracket. However, in a further embodiment, the lifting bracket comprises a driving means for displacing the lifting angle adjusting means along the lifting bracket without direct manual manipulation. For example, the driving means could comprise a motor, and the motor could be controlled by signals supplied over a suitable cable connection between the driving means and a controller located on the ground or in the nacelle, etc. The driving means may comprise a remote control module or unit realized to receive remote control signals for the lifting angle adjusting means. This does away with the need for additional signaling cables between the driving means and a controller. An advantage of this arrangement is that, after the load has been secured to its destination at the point of assembly, a controller—for example a service technician in the nacelle or on the ground—can adjust the position of the lifting angle adjusting means on the lifting bracket to compensate for the reduction in weight and the corresponding new centre of mass. In this way, when the load is detached and the lifting bracket—which is still suspended from the crane—is free to move, the lifting bracket can be safely maneuvered from the load without any danger of it swinging into the load and damaging it. In an embodiment the new position of the lifting angle adjusting means for the lifting bracket together with the empty transport frame may be at least as large as the lifting angle.

In an embodiment, the lifting bracket comprises an engaging means for engaging with the lifting angle adjusting means, so that the lifting angle adjusting means is secured at the desired position during any lifting maneuver. For example, the engaging means can comprise racks of teeth along complementary surfaces of the lifting bracket and the lifting angle adjusting means. The "teeth" can be large enough to provide a stable connection, and small enough to allow a relatively fine adjustment of the lifting angle. To adjust the position of the lifting angle adjusting means, the trolley can be raised (or lowered, as appropriate) to disengage the racks of teeth, moved to its new location, and lowered (or raised, as appropriate) to lock the trolley at its new position.

In a further embodiment, for additional stability when lifting a heavy load, the lifting bracket comprises a locking arrangement for locking the lifting angle adjusting means at a certain position on the lifting bracket, which position corresponds to the specific lifting angle for the load. The locking arrangement can comprise, for example, a locking plate and/or locking pins realized to secure the trolley in place on the lifting bracket. The locking arrangement effectively ensures that the engaging means—for example the complementary racks of teeth—remain securely engaged throughout the lifting procedure.

Since the lifting bracket itself can be very heavy, weighing in the order of 10000 kg, the lifting bracket may comprise a number of attaching means such as eyelets, padeyes or other suitable means for attaching the lifting bracket to a sling, rope or cable. Using these attaching means, the lifting bracket can be transferred from one location to another. The attaching means can be arranged on the lifting bracket so that this can be lifted in an essentially horizontal position (in contrast to the essentially vertical position during a load lifting procedure). For example, the lifting bracket can be secured to a crane by these attaching means, transferred in an essentially horizontal position to a generator transport assembly lying horizontally in preparation for lifting, and maneuvered such that the coupling device is inserted into an opening of the generator transport frame.

The lifting bracket can be moved from site to site so that it can be used in the assembly of wind turbines at different locations. Therefore, the lifting bracket may be dimensioned to fit in a standard container when mounted on a lifting bracket transport frame for transporting the lifting bracket. Such a lifting bracket transport frame may comprise a securing means realized to secure the lifting bracket on the frame during transport. The securing means may also be used to arrange the lifting bracket in at least two distinct orientations, for example a transport position in which the lifting bracket is arranged in a compact manner on the frame, and an upright position in which the lifting angle adjusting means is brought into the desired position corresponding to a lifting angle of the load to be lifted. The securing means could, for example, comprise a number of hydraulic pistons realized to bear the weight of the lifting bracket as it is tilted between positions. In an embodiment, the coupling device of the lifting bracket is realized to engage with the securing means of a lifting bracket transport frame for transporting the lifting bracket.

BRIEF DESCRIPTION OF THE DRAWINGS

Other objects and features will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

In the diagrams, like numbers refer to like objects throughout. Objects in the diagrams are not necessarily drawn to scale.

Figure 1:
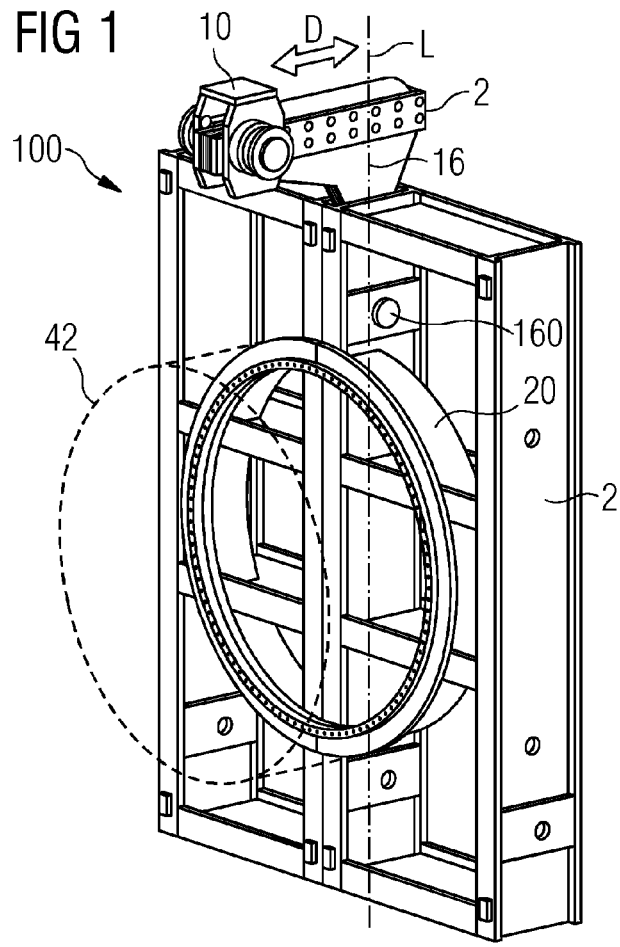
FIG. 1 shows a lifting assembly.

FIG. 1 shows a lifting assembly 100 according to an embodiment. The lifting assembly 100 comprises a lifting bracket 1 rigidly connected to a load 2, 42 such that these elements 1, 2, 42 essentially form a single entity 100. The load 2, 42 to be lifted comprises a wind turbine generator 42 (indicated by the broken line) securely mounted onto a generator transport frame 2. The wind turbine generator 42 can have been mounted onto the transport frame 2 at its point of manufacture, and transported in this mounted state to a wind turbine assembly site. This is done so that the generator 42 is protected from damage and deformation during the potentially hazardous transport and assembly stages. To this end, the transport frame 2 comprises a ring-shaped construction 20 or generator ring 20 that matches a diameter of the generator 42.

The lifting bracket 1 comprises an extension 16 that fits into a corresponding aperture in the transport frame 2, and which can be fastened to the transport frame 2 by a suitable fastener 160 such as a mounting pin 160. When connected together in this way, the lifting bracket 1 and the generator transport frame 2 of the load 2, 42 to be lifted share a common longitudinal axis L, indicated by the dashed line. As will be explained below, a lifting angle adjusting means 10 moveably mounted on the lifting bracket 1 is linearly displaceable in the direction D and will be used to obtain a specific a lifting angle of the load 2, 42.

Figure 2:
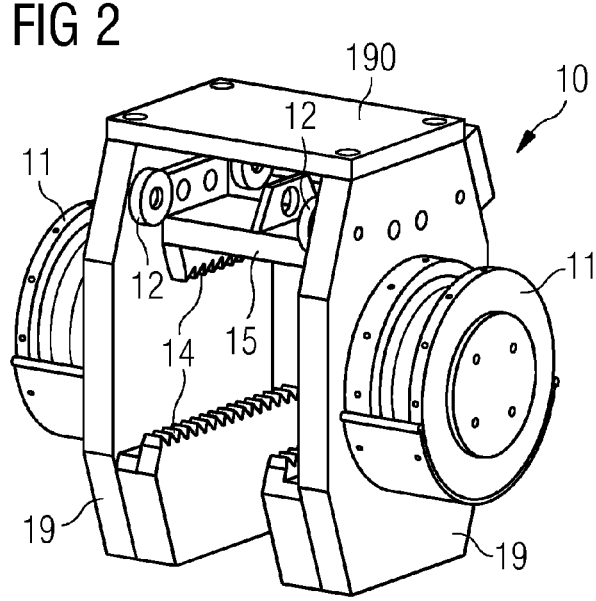
FIG. 2 shows a lifting angle adjusting means for the lifting bracket of the lifting assembly of FIG. 1.

FIG. 2 shows a lifting angle adjusting means 10 or "trolley" 10 for the lifting bracket 1 of the lifting assembly 100 of FIG. 1. Basically, the lifting angle adjusting means 10 comprises two side plates 19 or "jaws" 19 shaped to lie on either side of the lifting bracket 1. These are joined by a top plate 190, which will lie over or above the lifting bracket 1. A point of suspension 11 or trunnion 11 is mounted on each side plate 19. Toothed racks 14 are arranged on the interior of the trolley 10 such that these engage with corresponding tooted racks of the lifting bracket, as will be shown in the following diagrams. To fix the trolley 10 at a certain position on the lifting bracket 10, a locking plate 15 is arranged on the interior of the trolley 10. Wheels 12 allow the trolley 10 to "roll" along the lifting bracket 1 when the toothed racks 14 are disengaged.

Figure 3:
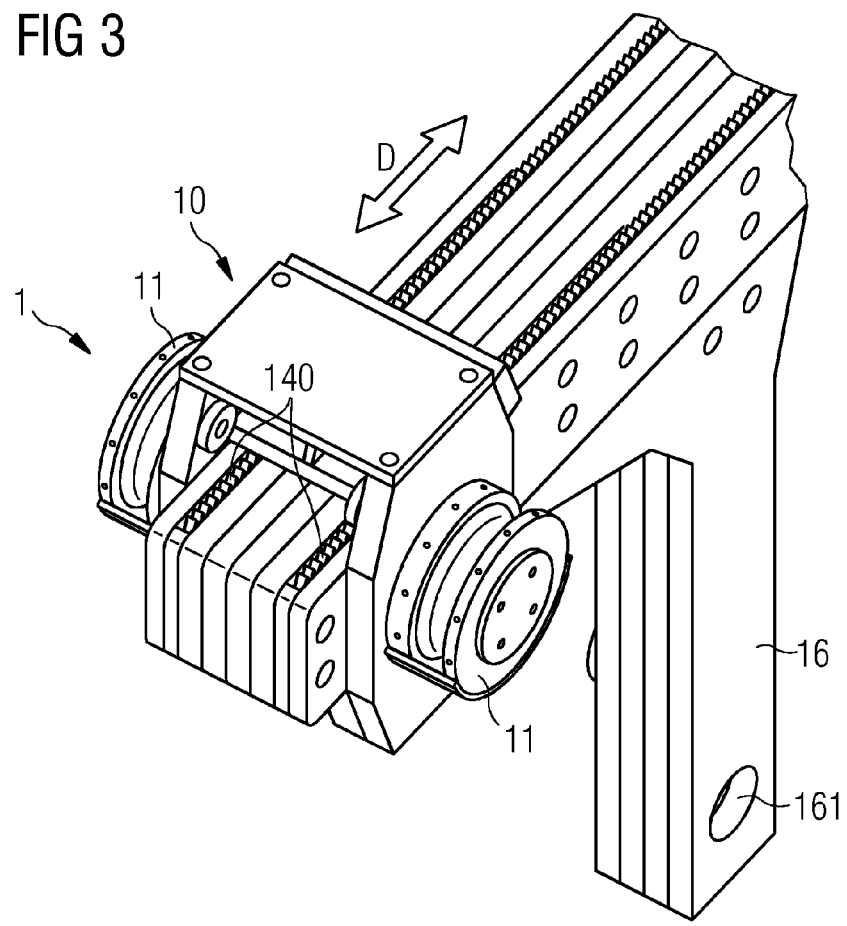
FIG. 3 shows a first view of the lifting bracket of the lifting assembly of FIG. 1.
Figure 4:
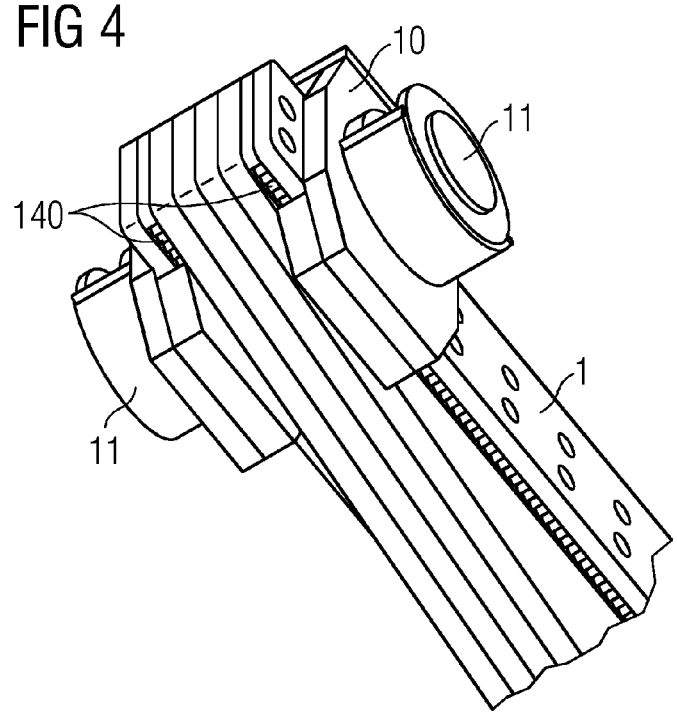
FIG. 4 shows a second view of the lifting bracket of the lifting assembly of FIG. 1.

FIG. 3 shows a first view of the lifting bracket 1 of the lifting assembly 100 of FIG. 1. The trolley 10 is shown at an outer position on the lifting bracket 1. As the diagram indicates, the lifting bracket 10 can be made by bolting together a stack of structural steel forms between two outer plates. For example, the forms and optionally also the outer plates can be made of a high-strength structural steel such as Weldox® 700. Such a construction is very strong and will not deform easily under load. Toothed racks 140 are arranged along the outer edge of the lifting bracket 1 to engage with corresponding toothed racks of the trolley 10. FIG. 4 shows a partial view of the lifting bracket 1 from underneath, showing another set of tooted racks 140 on the underside, arranged to engage with corresponding toothed racks of the trolley 10. In this embodiment, the lifting bracket 1 and lifting angle adjusting means 10 are realized to achieve a linear displacement in the range of 2200 mm in the direction D indicated, thus allowing a large generator or similar component to be tilted at a specific angle to an assembly point. The size of the teeth in the toothed racks 140 of the lifting bracket 1 and corresponding toothed racks of the trolley 10 can be chosen to allow quite precise adjustments of position of the trolley 10 relative to the lifting bracket 1. In this embodiment, the mounting means 16 is shaped to fit into a corresponding cavity of the transport frame 2 of FIG. 1, and comprises a through hole 161 for accommodating a mounting pin inserted through a corresponding opening of the transport frame.

Figure 5:
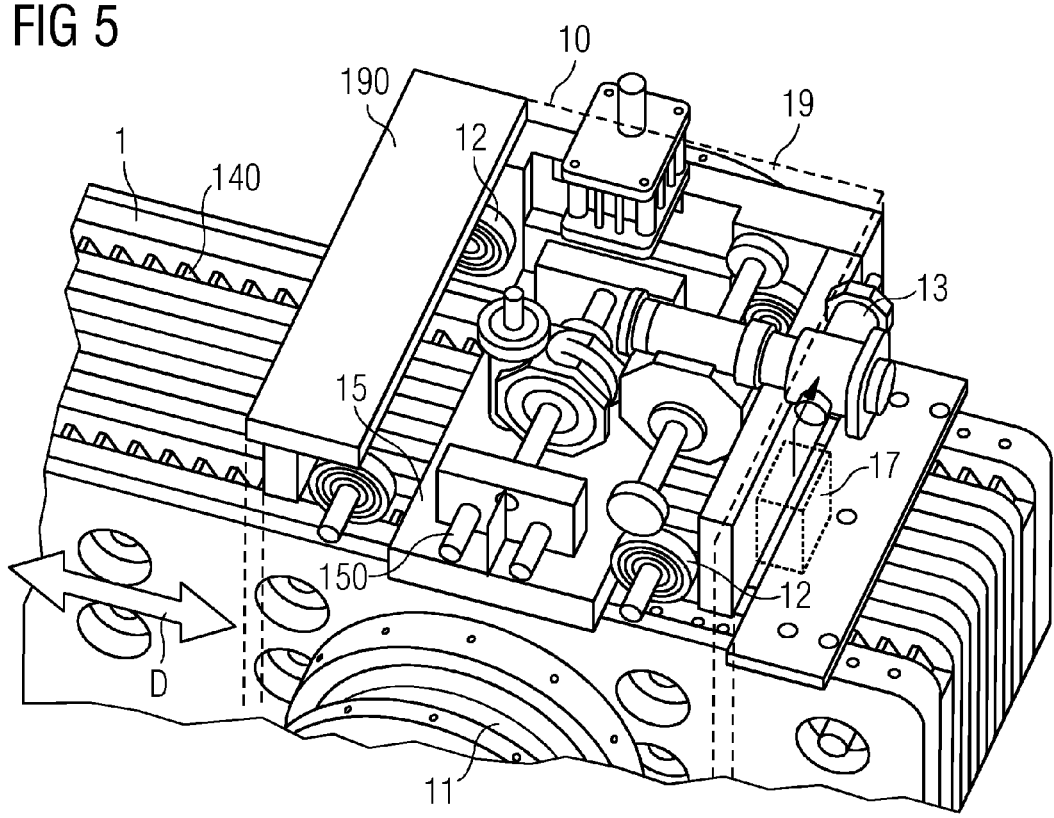
FIG. 5 shows a cutaway view of the lifting angle adjusting means of FIG. 2.

FIG. 5 shows a simplified cutaway view of the lifting angle adjusting means 10 of FIG. 2, showing various parts that would otherwise be hidden by the side walls 19 and the top plate 190. Cutaway parts are indicated by the dotted lines. The trolley 10 comprises a driving means 13, in this case a motor 13, which can actuate a locking plate 15 and locking pins 150 to lock the trolley in place on the lifting bracket 1 such that the toothed racks 14, 140 are engaged. The locking plate 15 acts to raise or lower the trolley 10 relative to the lifting bracket 1 to lock the trolley in place, or to release the locking plate 15 and locking pins 150 so that the trolley 10 can be moved to a new position on the lifting bracket 1. To this end, the driving means 13 is also realized to drive a number of wheels 12, allowing the trolley 10 to roll easily along the lifting bracket 1 in the direction of travel D. The driving means 13 can comprise a motor 13 and a number of worm gears and axles realized to actuate the various moving parts 15, 150, 12. A remote control module 17 can receive control signals transmitted from a controller, for example a service technician in or on a nacelle of a wind turbine or standing on the ground 7, and can convert these signals into a form suitable for actuating the driving means 13.

Figure 6:
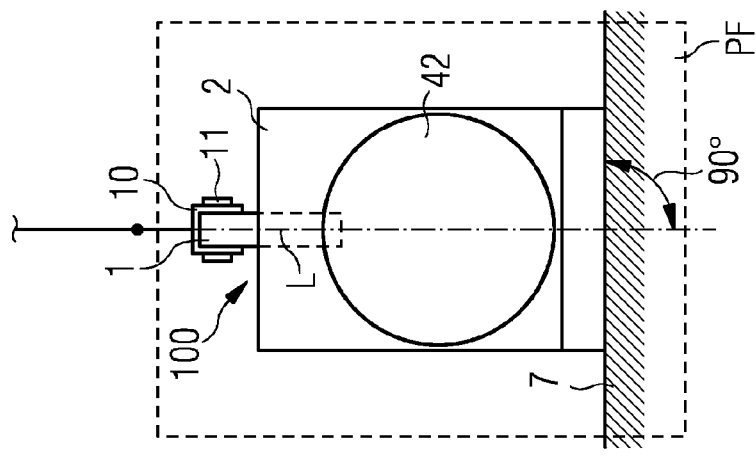
FIG. 6 shows a front view of a lifting assembly in a resting state on the ground.

FIG. 6 shows a front view of a lifting assembly 100 in a resting state on the ground 7. The diagram shows the generator transport frame 2 and the generator 42 from the front. The lifting bracket 1 has been connected to the generator transport frame 2 using the mounting means 16 (indicated here and in the following two diagrams by the broken line) and a mounting pin such that the lifting bracket 1 and the generator transport frame 2 share a common central longitudinal axis L. This axis L is also an axis of symmetry. The vertical part of the generator transport frame 2 defines a vertical frontal plane PF, in which the shared longitudinal axis L is essentially perpendicular to the ground 7, as indicated by the angle of 90°. During lifting, the lifting assembly 100 will essentially retain the given orientation in this vertical frontal plane PF.

Figure 7:
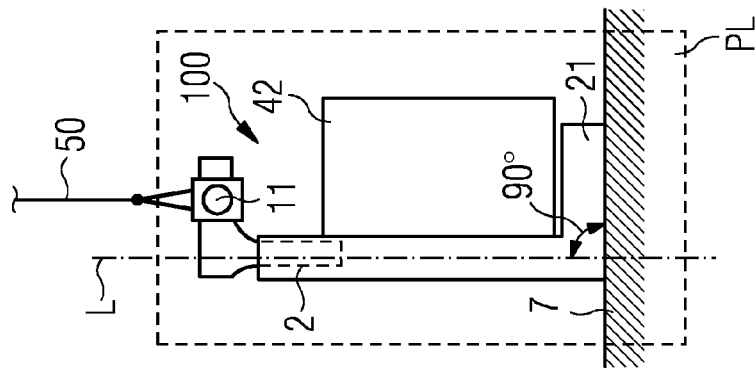
FIG. 7 shows a side view of the lifting assembly of FIG. 6.

FIG. 7 shows a side view of the lifting assembly 100 of FIG. 6, with the transport frame 2 still resting on the ground 7. The diagram shows a vertical lateral plane PL at essentially right angles to the vertical frontal plane PF of FIG. 6. The diagram shows the transport frame 2 to have an L-shape with a foot 21 that allows the load 2, 42 to rest on the ground 7 while a chain 50 or sling 50 is put into place about the trunnions 11 on either side of the trolley 10. The position of the trolley 10 on the lifting bracket 1 has previously been adjusted in order to obtain a specific lifting angle for this particular load 2, 42. To determine the position, the weight and dimensions of the load have been calculated, taking into account the centre of mass of the load 2, 42 in combination with the lifting bracket 1 as it will be suspended from the point of suspension 11.

Figure 8:
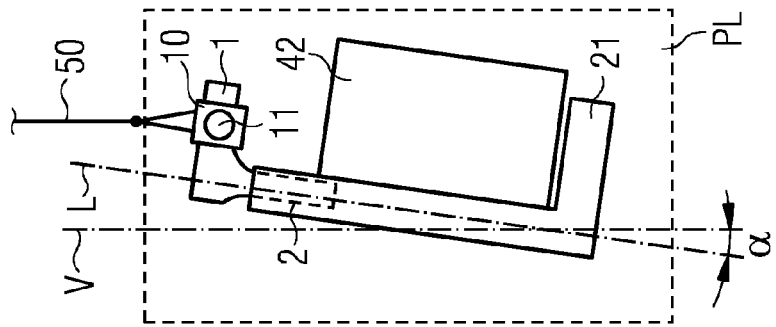
FIG. 8 shows a side view of the lifting assembly of FIG. 6 in a suspended state above the ground.

FIG. 8 shows a side view of the lifting assembly 100 of FIGS. 6 and 7 in a suspended state above the ground, i.e. in the air. A crane 5 (not shown) has raised the sling 50 so that the entire lifting assembly 100 is also raised. Once the lifting assembly 100 leaves the ground, the combined load 2, 42 and the lifting bracket 1 tilts to the lifting angle α previously calculated, and for which the trolley 10 has been fixed into position on the lifting bracket 1. This lifting angle α will now be maintained during the entire lifting procedure to the point of assembly. The lifting angle α is angle subtended between a vertical plumb line V and the longitudinal axis L of the lifting assembly 100 in the vertical lateral plane PL.

Figure 9:
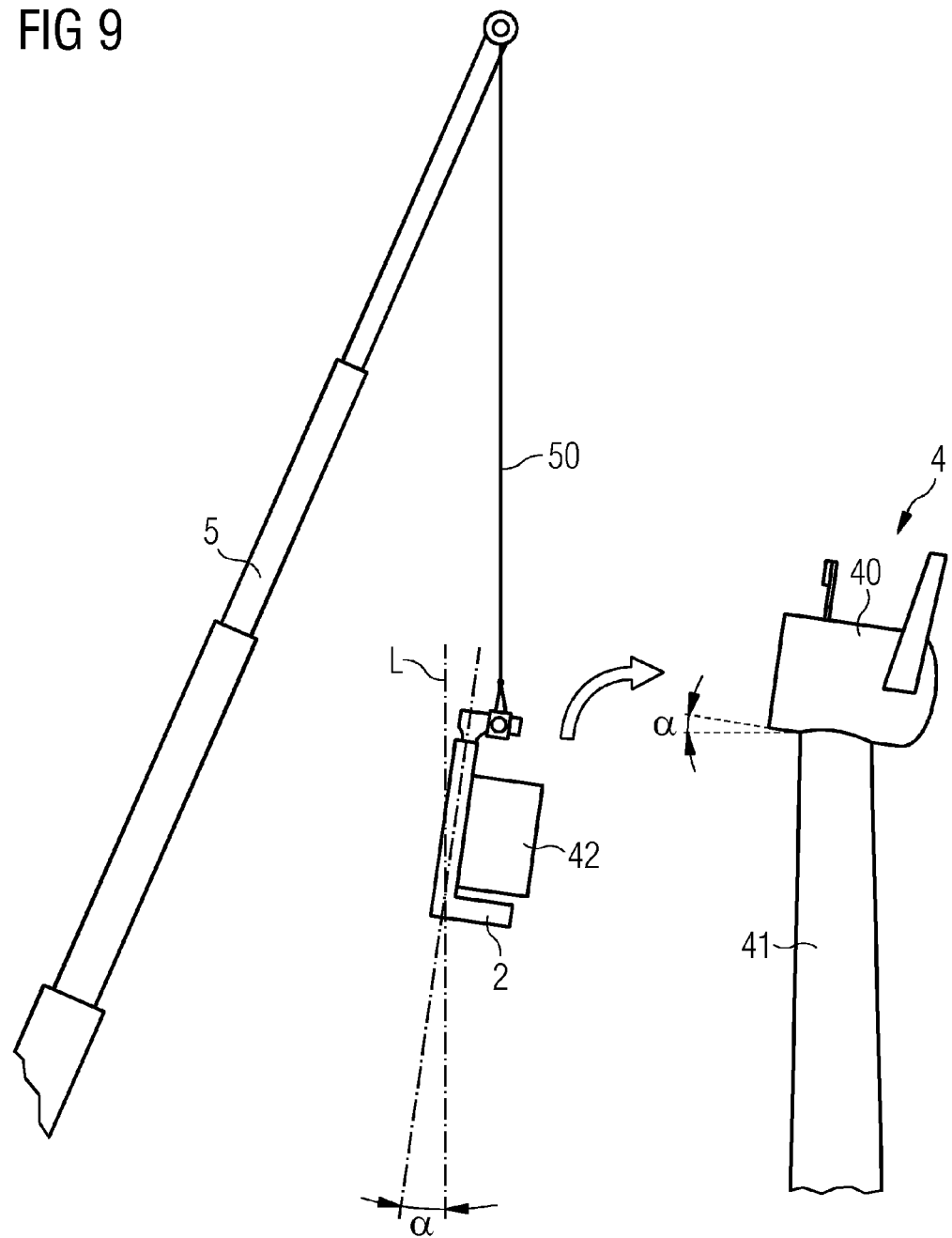
FIG. 9 shows a side view of the lifting assembly of FIG. 6 in a suspended state approaching a point of assembly.

FIG. 9 shows a side view of the lifting assembly 100 of FIG. 8 in a suspended state approaching a point of assembly, i.e. a nacelle 40 of a partially assembled wind turbine 4. The nacelle 40 has been previously mounted on a tower 4, for example at a height of 100 m above ground. The nacelle 41 is angled slightly upward from the horizontal. This is the angle of attack α of the wind turbine, and typically comprises about 6°. The load 2, 42 is lifted at the lifting angle α, which corresponds to the angle of attack α, to the front of the nacelle 41 where it can be detached from the transport frame 2 by service personnel. With the lifting bracket 1 and the lifting angle adjusting means 10, the generator 42 is already tilted at the required mounting angle α and does not need to be manipulated manually at the point of assembly, an operation which can be hazardous and difficult. When the generator 42 is in place at the front of the nacelle 41, service personnel can issue remote control commands to a remote control module of the lifting bracket 1 so that the trolley 10 is moved to a position suitable for safely detaching the now empty transport frame from the generator 42. This is an important consideration, since the altered centre of mass would otherwise allow the heavy transport frame 2 to collide with the mounted generator 42. Therefore, the trolley 10 is moved to a new position before the empty transport frame 2 is moved away from the generator 42. In an embodiment, the new position for the lifting bracket together with the empty transport frame may correspond to the original lifting angle α. Then, the crane 5 can move the transport frame away from the generator 42 and can lower the empty lifting assembly to ground again.

Figure 10:
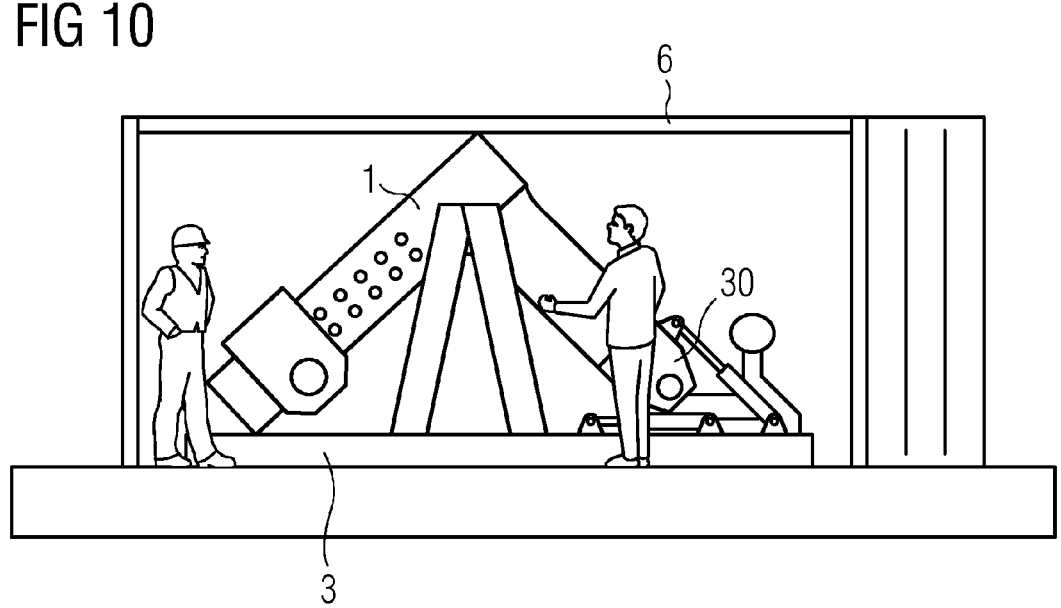
FIG. 10 shows a lifting bracket on a lifting bracket transport frame in a standard container.

FIG. 10 shows a lifting bracket 1 on a lifting bracket transport frame 3 in a standard container 6. The simplified diagram shows that the lifting bracket 1 can be arranged on the lifting bracket transport frame 3 so that, together, these fit into the standard container 6. This is important consideration, since the lifting bracket 1 must be transported, for example by sea, to various assembly sites and should be protected from damage during such journeys.

Figure 11:
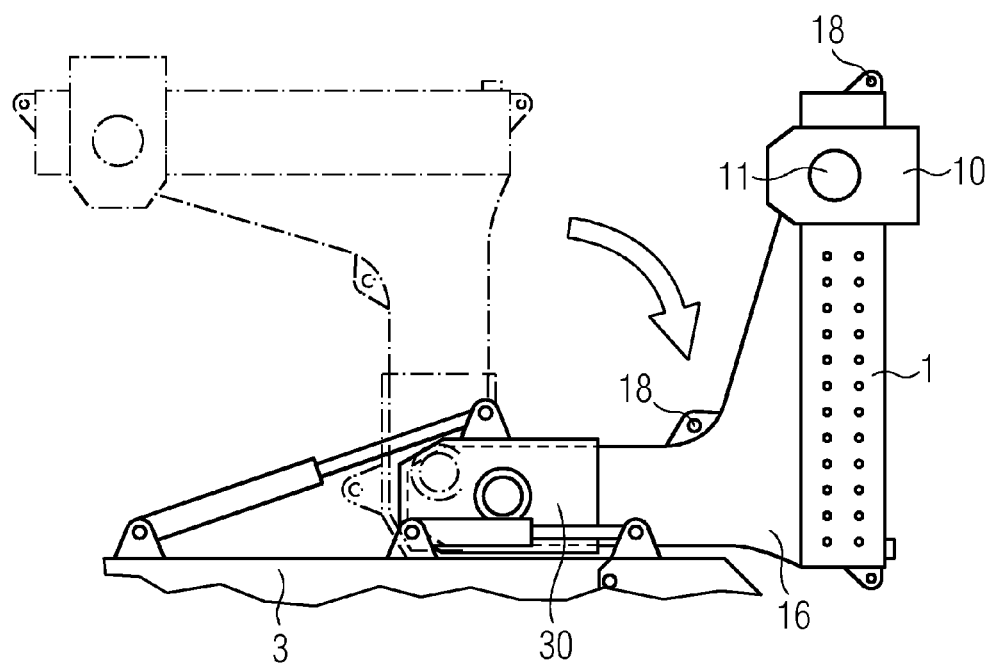
FIG. 11 shows the lifting bracket of FIG. 10 in a number of positions on the lifting bracket transport frame.

FIG. 11 shows the lifting bracket 1 of FIG. 10 in a number of positions on the lifting bracket transport frame 3. The lifting bracket transport frame 3 comprises a hydraulic securing means 30 realized to fit about the mounting means 16 of the lifting bracket 1. The hydraulic securing means 30 can raise and lower the lifting bracket 1 safely and in a controlled manner between a transport position (shown in FIG. 10 above), a vertical position (indicated by the dashed lines here) in which the position of the trolley 10 can be adjusted by service personnel for a load lifting maneuver, and a horizontal mounting position (shown here). In this horizontal mounting position, a rope or chain can be connected between attaching means 18—here padeyes 18—and a crane (not shown), for lifting the lifting bracket 1 so that its mounting means 16 can be removed from the hydraulic securing means 30 and inserted into an aperture of a generator transport frame, or vice versa. Since the hydraulic securing means 30 is mounted on the lifting bracket transport frame 3, these can collectively be referred to as a "hydraulic upending means" 3, 30.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality. The terms "unit" or "module" do not exclude the use of several units or modules.

The invention claimed is:

1. A lifting bracket assembly, comprising:
  a bracket configured to operably engage means for adjusting a lifting angle, and having a coupling device extending therefrom, said coupling device adapted to selectively attach the lifting bracket assembly to a device for moving a load;

said means for adjusting a lifting angle selectively engaged to the bracket such that the bracket is at least partially received within the means for adjusting a lifting angle; and a point of suspension mounted to the means for adjusting a lifting angle, said point of suspension adapted to removably attach the lifting bracket assembly to means for lifting a load.

2. The lifting bracket assembly according to claim 1,
wherein the coupling device comprises a lifting bracket extension adapted for coupling with the load to be lifted such that the lifting bracket extension and the load to be lifted share a common longitudinal axis.

3. The lifting bracket assembly according to claim 1,
wherein the means for adjusting a lifting angle is movably mounted on the bracket.

4. The lifting bracket assembly according to claim 1,
wherein the means for adjusting a lifting angle is mounted on the bracket such that the means for adjusting a lifting angle is linearly displaceable along the bracket.

5. The lifting bracket assembly according to claim 4,
wherein a direction of linear displacement of the means for adjusting a lifting angle along the bracket is essentially perpendicular to a common longitudinal axis of the coupling device and the load to be lifted.

6. The lifting bracket assembly according to claim 1,
wherein the means for adjusting a lifting angle is adapted to obtain a lifting angle corresponding to a fitting angle of a generator of a wind turbine.

7. The lifting bracket assembly according to claim 1,
wherein the point of suspension is removably mounted on the means for adjusting a lifting angle.

8. The lifting bracket assembly according to claim 1, further comprising:
driving means for displacing the means for adjusting a lifting angle along the bracket.

9. The lifting bracket assembly according to claim 1, comprising:
a locking arrangement for locking the means for adjusting a lifting angle at a position on the bracket, which position corresponds to a specific lifting angle for the load.

10. The lifting bracket assembly according to claim 1, comprising:
a remote control module realized configured to receive control signals for the means for adjusting a lifting angle.

11. The lifting bracket assembly according to claim 1,
wherein the coupling device is adapted to engage a transport frame.

12. The lifting bracket assembly according to claim 1,
wherein the lifting bracket assembly is dimensioned to fit in a standard container when mounted on a transport frame.

13. A lifting assembly comprising:
a lifting bracket assembly according to claim 1; and
a wind turbine generator transport frame assembly comprising a wind turbine generator mounted on a wind turbine generator transport frame;
wherein the lifting bracket assembly is rigidly coupled to the wind turbine generator transport frame via the coupling device such that such that the coupling device and the wind turbine generator transport frame share a common longitudinal axis.

14. A method of lifting a wind turbine generator transport assembly, comprising a wind turbine generator mounted on a wind turbine generator transport frame, at a specific lifting angle, the method comprising:
forming the lifting assembly according to claim 13 by connecting the lifting bracket assembly to the wind turbine generator transport assembly;
determining a position of the point of suspension along the lifting bracket assembly to obtain the specific lifting angle for that wind turbine generator;
adjusting the lifting angle adjusting means according to the determined position of the point of suspension;
connecting a suspending means between a lifting means and the point of suspension of the lifting bracket assembly; and
raising the lifting assembly to lift the wind turbine generator at the specific angle to a point of assembly.

15. The method according to claim 14, comprising:
adjusting the lifting angle adjusting means according to a lowering angle for the lifting bracket assembly and the wind turbine generator transport frame after the generator has been detached from the wind turbine generator transport frame; and
lowering the lifting bracket assembly and the wind turbine generator transport frame at the lowering angle away from the point of assembly.

* * * * *